United States Patent [19]
Adler

[11] Patent Number: 5,899,097
[45] Date of Patent: May 4, 1999

[54] WATER-SAVING DEVICE FOR WASHING MACHINE AND WASHING MACHINE EQUIPPED WITH SUCH A DEVICE

[75] Inventor: Michel Adler, Villery, France

[73] Assignee: Electrolux Systemes de Blanchisserie, Rosieres, France

[21] Appl. No.: 09/003,350

[22] Filed: Jan. 6, 1998

[30] Foreign Application Priority Data

Jan. 10, 1997 [FR] France .................................. 97 00200

[51] Int. Cl.⁶ .................................................. D06F 39/08
[52] U.S. Cl. ............................. 68/18 R; 68/207; 68/902
[58] Field of Search .................................... 68/902, 18 R, 68/207

[56] References Cited

U.S. PATENT DOCUMENTS 2,588,774  3/1952  Smith .................................... 68/902 X
4,777,682  10/1988  Dreher et al. ......................... 68/18 R X

FOREIGN PATENT DOCUMENTS

0287990 A2  10/1988  European Pat. Off. .
29 10 140 A1  9/1980  Germany .
886128  1/1962  United Kingdom .................... 68/18 R Primary Examiner—Philip R. Coe
Attorney, Agent, or Firm—Pearne, Gordon, McCoy & Granger LLP

[57] ABSTRACT

With a view to saving water consumed in a washing machine (10), the water used during the last two rinsing operations is recovered in a recovery tank (20) so that it may be used during the next washing cycle for the purpose of carrying out the prewash and washing operations and the first rinsing operation. The water is transported to the tank (20) by a filling pipe (22) fitted with a pump (30). The water recovered in the tank (20) is used by opening, in a given order, solenoid valves (32, 34, 36) placed in extraction pipes (24, 26, 28) entering the tank (20) at given locations.

9 Claims, 1 Drawing Sheet

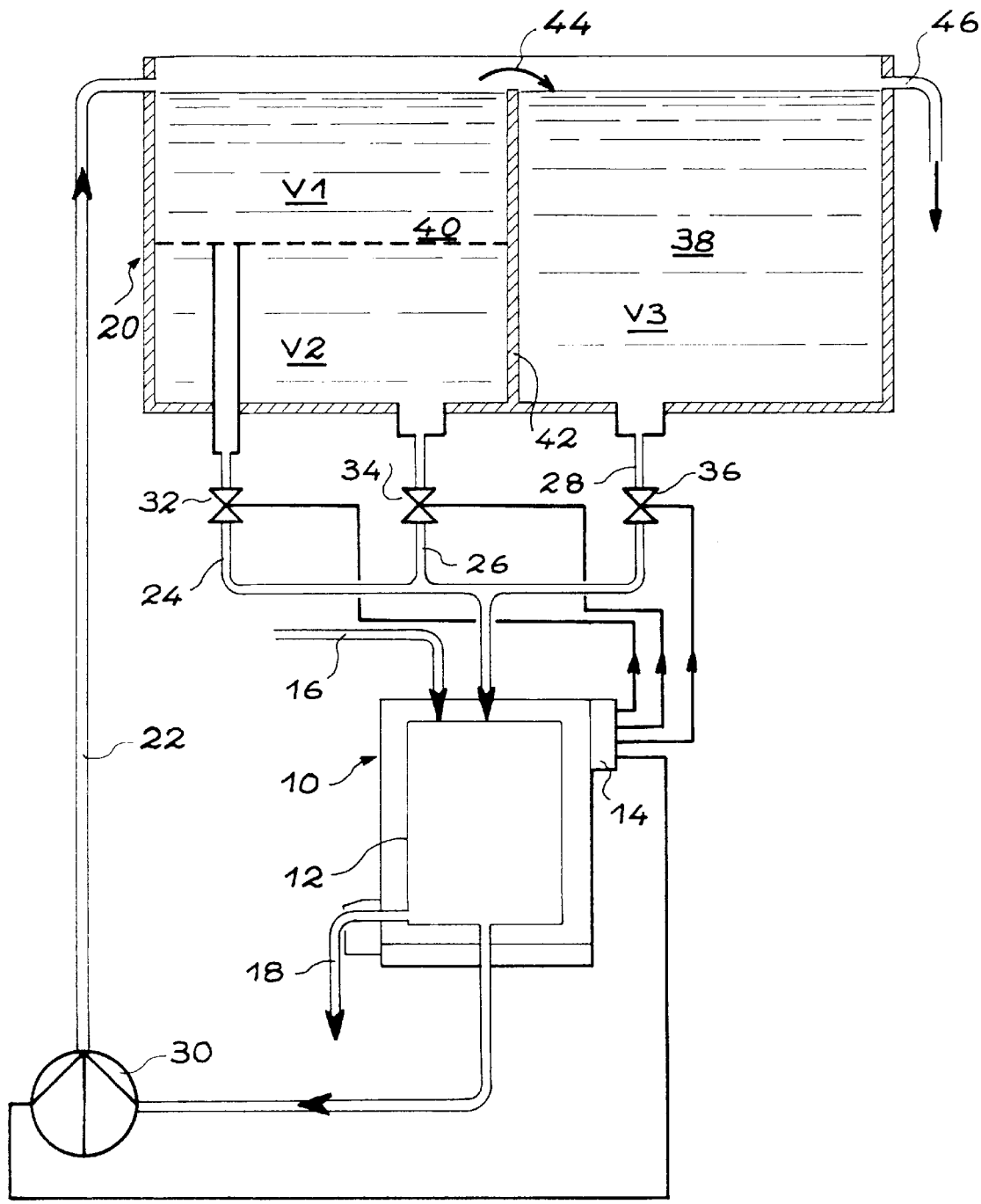

WATER-SAVING DEVICE FOR WASHING MACHINE AND WASHING MACHINE EQUIPPED WITH SUCH A DEVICE

DESCRIPTION

1. Technical Field

This invention concerns a water saving-device designed to be incorporated in a washing machine, or associated with such a machine, in order to allow the recycling of part of the water consumed by this machine during use.

The invention also concerns a washing machine fitted with such a water-saving device.

The water-saving device conforming to the invention may be used on any type of washing machine and concerns washing machines for domestic as well as for industrial or semi-industrial use such as those installed in public establishments (hotels, schools, hospitals, restaurants, etc.).

2. Prior Art

In a domestic or industrial washing machine, a washing cycle usually comprises a prewash operation, a washing operation and three rinsing operations. This washing cycle necessitates filling up the washing unit of the washing machine with water at the start of each operation and then evacuating this water from the washing unit.

In standard machines, the water admitted to the washing unit at the start of each operation of the washing cycle comes from the mains system to which the machine is connected. At the end of each operation, the water is purged from the machine and evacuated towards the drain.

The standard functioning of washing machines is thus characterized by heavy water consumption at each washing cycle.

For economic reasons and with a view to protecting the environment, it is becoming increasingly desirable to reduce water consumption in all areas. This necessity has led washing machine designers to study arrangements making it possible to recycle part of the water which, in standard machines, is usually evacuated into the drain.

In the case of washing cycles which include three rinsing operations, an arrangement consists in recovering the water which is evacuated at the end of the last two rinsing operations and to which no detergent product has been added. This water is then sent to three recovery tanks of different volumes. In the course of the next washing cycle, the water contained in one of these tanks is used for the prewash operation, the water contained in another tank is used for the washing operation and the water contained in the third (and largest) tank is used for the first rinsing operation.

This arrangement makes it possible to recycle and thus economize almost half of the water used in the course of a washing cycle. However, the distribution of the water recovered during the last two rinsing cycles to three different tanks necessitates the addition of hydraulic distributors and accompanying control systems. This results in a relatively high cost and in an appreciably higher risk of breakdown than with a machine not equipped with a water-saving device.

DISCLOSURE OF THE INVENTION

The invention specifically concerns a water-saving device of a particularly simple and reliable conception, designed to be fitted on a washing machine, or associated with such a machine, so that nearly half of the water consumed in the course of a washing cycle can be recycled.

In conformity with the invention, this result is achieved by means of a water-saving device, for a washing machine fitted with a washing unit and driving means for carrying out a washing cycle comprising a prewash operation, a washing operation and at least two rinsing operations, this device being characterized in that it comprises;

- a single recovery tank;
- a filling pipe linking the washing unit of the washing machine to the recovery tank via pumping machines capable of being activated by the driving means, at least during the last rinsing operation; and
- at least two extraction pipes linking different locations of the recovery tank to the washing unit, via extraction means capable of being activated in turn by the driving means, at least during the prewash and washing operations.

A water-saving device designed in this way makes it possible to recycle all the water recovered during the rinsing operations carried out without detergent products into the single recovery tank via the same filling pipe, without having to resort to hydraulic distributors or to the electronic control systems which must accompany such distributors. The cost of this water-saving device is thus kept to a minimum while its reliability is enhanced.

In the water-saving device according to the invention, the proportions of water extracted from the recovery tank, particularly during the prewash operation and the washing operation, are determined by the order in which the extraction means are activated and by the locations through which the extraction pipes enter the recovery tank.

In a preferential embodiment of the invention, the recovery tank is placed at a level which is above that of the washing unit and the extraction means are solenoid valves. This arrangement makes it possible for the water to be transferred by gravity from the recovery tank to the washing unit of the washing machine, at each opening of the solenoid valve.

As has already been seen, the washing cycle of a washing machine usually includes three rinsing operations. In this case, the device comprises three extraction pipes equipped with extraction means which can be activated in turn by the driving means, respectively during the prewash operation, the washing operation and the first rinsing operation. Moreover, the pumping means can then be activated by the driving means during the last two rinsing operations.

In this case, the recovery tank advantageously includes two adjoining compartments which communicate with each other by means of an overflow. A first extraction pipe enters a first compartment, the filling pipe and the other two extraction pipes entering the second compartment, at different levels.

Preferentially, the two compartments of the recovery tank are of approximately the same volume.

In the preferential embodiment of the invention, the first extraction pipe enters the bottom of the first compartment and a second extraction pipe enters the bottom of the second compartment.

Advantageously, the extraction means equipping respectively the third, second and first extraction pipes are capable of being activated successively in this order by the washing machine's driving means, respectively during the prewash operation, the washing operation and the first rinsing operation of each washing cycle.

The invention also concerns a washing machine comprising such a water-saving device.

BRIEF DESCRIPTION OF THE DRAWINGS

A non-limitative example of a preferential embodiment of the invention will now be described, with reference to the accompanying drawing, in which the single FIGURE is a schematic representation of a washing machine equipped with a water-saving device conforming to the invention.

DETAILED DESCRIPTION OF A PREFERENTIAL EMBODIMENT

In the single figure, reference 10 is a general representation of a washing machine whose washing unit is illustrated schematically in 12.

The washing machine 10 is equipped with driving means 14 such as a program selector for carrying out a predetermined washing cycle when the washing machine 10 is functioning. The washing cycle defined by the driving means 14 generally comprises five successive operations constituted by a prewash operation, a washing operation and three consecutive rinsing operations. In certain exceptional cases, provision is made for only two rinsing operations.

Typically, the washing unit 12 of the washing machine 10 is connected to a water inlet pipe 16 and to an evacuation pipe 18. The water inlet pipe 16 is linked to the water mains and, if necessary, to an external hot water system. The evacuation pipe 18 is linked to a drain.

Typically, the washing machine is also equipped with different compartments (not represented) capable of receiving detergent products.

In conformity with the invention, a water-saving device is added to the washing machine 10, which said water-saving device comprises principally, in the embodiment represented, a single recovery tank 20, a single filling pipe 22, and three extraction pipes 24, 26 and 28.

More specifically, the recovery tank 20 is designed to be integrated with the washing machine 10 at the manufacturing stage or to be added to an existing washing machine. In both cases, the recovery tank 20 is placed at a level which is higher than that of the washing unit 12 of the washing machine 10. For this purpose, the recovery tank 20 may in particular be placed immediately above,. and rest on, the washing machine 10.

The filling pipe 22 connects the bottom of the washing unit 12 of the washing machine 10 to the recovery tank 20. Pumping means 30 are placed in the filling pipe 22 in order to pump the water contained in the washing unit 12 of the washing machine 10 towards the recovery tank 20 at times which will be specified at a later stage of this description. The pumping means 30 may notably be constituted by a pump whose motor is electrically protected by a thermal contact.

In addition, each of the extraction pipes 24, 26 and 28 connects a different location of the recovery tank 20 to the washing unit 12 of the washing machine 10. An extraction means 32, 34 and 36, in this case constituted by a solenoid valve, is placed respectively in each of the extraction pipes 24, 26 and 28.

The pumping means 30 and each of the solenoid valves 32, 34 and 36 are connected to the driving means 14 so as to be controlled by the said driving means. When not excited, the solenoid valves 32,34 and 36 are usually closed.

In the embodiment illustrated in the single FIGURE, the interior of the recovery tank 20 is demarcated by two adjoining compartments 38 and 40 separated by an internal partition 42. The upper part of the partition 42 is interrupted so as to form an overflow 44 by which the compartments 38 and 40 communicate.

The filling pipe 22 enters the compartment 40, preferentially at a level which is slightly higher than that of the overflow 44. Moreover, the recovery tank 20 is equipped, for example in the compartment 38, with an overflow pressure switch 46 mounted in a pipe connected to the drain. This overflow pressure switch limits the filling of the tank to a maximum admissible value.

The compartments 38 and 40 demarcated inside the recovery tank 20 are preferentially approximately equal.

As the FIGURE shows, the extraction pipe 24 enters the compartment 40 approximately at mid-height in relation to the overflow 44. The extraction pipe 26 enters the bottom of the compartment 40. Lastly, the extraction pipe 28 enters the bottom of the compartment 38.

Before the washing machine 10 is used for the first time, the recovery tank 20 is empty and cannot therefore be used until after a first washing cycle controlled by the driving means 14.

In the course of this first washing cycle, a prewash operation is carried out with hot or cold water admitted by the pipe 16. A determined quantity of an approved detergent product is automatically added to the prewash water by the driving means 14. At the end of this prewash operation, the water is evacuated to the drain by the evacuation pipe 18.

The washing operation and then the first rinsing operation are next carried out successively, in approximately the same way.

During the second rinsing operation, cold water without the addition of detergent product is admitted to the washing unit 12 by the pipe 16. At the end of this operation, the water is recovered and recycled to the recovery tank 20 through a first application of the pumping means 30. The recovered water gradually fills the compartment 40 of the recovery tank 20 (the solenoid valves 32, 34 and 36 still being closed).

During the third rinsing operation, cold water from the mains, without the addition of detergent product, is again admitted to the washing unit by the pipe 16. At the end of the rinsing operation, the water is recovered and recycled to the recovery tank 20 through a second application of the pumping means 30. The water admitted to the compartment 40 then gradually fills the compartment 38 by the overflow 44, once the level of the said overflow 44 is reached. At the end of the last rinsing operation, the two compartments 38 and 40 of the recovery tank 20 should be practically full.

As from the next washing cycle and during all subsequent washing cycles, the recovery tank 20 is used and supplies almost half of the water required to carry out a complete washing cycle.

Thus, when the driving means 14 control the prewash operation, the solenoid valve 32 inserted in the extraction pipe 24 is open and the entire volume V1 of water, placed in the compartment 40 above the opening of the extraction pipe 24, flows by the effect of gravity into the washing unit 12 of the washing machine. The appropriate prewash detergent products are automatically added to the water admitted to the washing unit 12, by the driving means 14. When the prewash operation is completed, the water is evacuated to the drain by the evacuation pipe 18.

When the driving means 14 next control the washing operation, the solenoid valve 32 is closed and the solenoid valve 34 is in its turn open so that the remaining volume V2 of water contained in the compartment 40 empties in its turn by the effect of gravity into the washing unit 12, by the extraction pipe 26. The appropriate prewash detergent products are once again added to the water admitted to the washing unit 12, by the driving means 14. When the washing operation is completed, the water is evacuated to the drain by the evacuation pipe 18.

When the driving means 14 control the first rinsing operation, the solenoid valve 34 is closed and the solenoid valve 36 is in its turn open so that the volume V3 of water contained in the compartment 38 of the recovery tank 20 is admitted by the effect of gravity to the washing unit 12 of the washing machine, via the extraction pipe 28. The appropriate detergent products are added to this water through the driving means 14. The water is evacuated to the drain by the evacuation pipe 18.

When the driving means 14 control the second rinsing operation, the solenoid valve 36 is closed and the cold water from the mains is admitted to the washing unit 12 by the pipe 16. At the end of this second rinsing operation, the water is recovered and recycled in the recovery tank 20 by the pump 30. The third rinsing operation is carried out in a similar way so that, when the washing cycle is completed, the two compartments 38 and 40 of the recovery tank 20 are once again filled with water.

It should be noted that, if the need arises and if the volume of water available from the recovery tank proves to be insufficient, the driving means 14 may be used to provide additional water to the washing unit 12, through the pipe 16.

As a variant, the recovery tank 20 may also contain a single compartment in which the extraction pipes 24, 26 and 28 then enter at three different levels. According to another variant, the recovery tank contains three adjacent compartments which are filled by draining off from a first compartment and in the bottom of which the three extraction pipes enter.

In another (not represented) embodiment, the recovery tank is placed next to the washing unit of the washing machine. At least one additional pump is required in order to transport the water contained in the tank to the washing unit.

Finally, it should be noted that it is possible to recover the water used in the washing unit during the last rinsing operation only, particularly in the case of a washing cycle comprising only two rinsing operations. In this case the recycled water is only used during the prewash and washing operations.

I claim:

1. Water-saving device, for a washing machine fitted with a washing unit and driving means for carrying out a washing cycle comprising a prewash operation, a washing operation and at least two rinsing operations, this device comprising;

a single recovery tank;

a filling pipe linking the washing unit of the washing machine to the recovery tank via pumping machines capable of being activated by the driving means, at least during the last rinsing operation; and at least two extraction pipes linking different positions of the recovery tank to the washing unit of the washing machine, via extraction means capable of being activated in turn by the driving means, at least during the prewash and washing operations.

2. Device according to claim 1, wherein the recovery tank is placed at a level which is higher than that of the washing unit and the extraction means are solenoid valves.

3. Device according to claim 1, wherein, the washing cycle comprising three rinsing operations, the device comprises three extraction pipes equipped with extraction means capable of being activated in turn by the driving means, respectively during the prewash operation, the washing operation and the first rinsing operation, the driving means being able to activate the pumping means during the last two rinsing operations.

4. Device according to claim 3, wherein the recovery tank comprises two adjoining compartments communicating with each other by an overflow, a first extraction pipe entering a first compartment, the filling pipe and the other two extraction pipes entering the second compartment, at different levels.

5. Device according to claim 4, wherein the two compartments have approximately the same volume.

6. Device according to claim 4, wherein the first extraction pipe enters the bottom of the first compartment and a second extraction pipe enters the bottom of the second compartment.

7. Device according to claim 6, wherein the extraction means equipping respectively the third, second and first extraction pipes can be activated successively in this order by the driving means, respectively during the prewash operation, the washing operation and the first rinsing operation of each washing cycle.

8. Device according to claim 1, wherein the recovery tank is fitted with an overflow pressure switch.

9. Washing machine, comprising a washing unit and driving means for carrying out a washing cycle comprising a prewash operation, a washing operation and at least two rinsing operations, the said washing machine also comprising a water-saving device including:

a single recovery tank;

a filling pipe linking the washing unit of the washing machine to the recovery tank via pumping machines capable of being activated by the driving means, at least during the last rinsing operation; and at least two extraction pipes linking different positions of the recovery tank to the washing unit of the washing machine, via extraction means capable of being activated in turn by the driving means, at least during the prewash and washing operations.

* * * * *